Patented May 21, 1929.

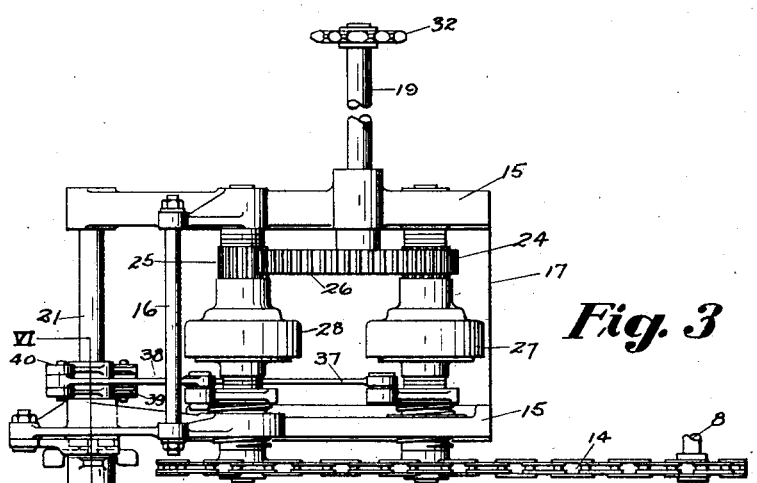

1,714,032

UNITED STATES PATENT OFFICE.

WILLIAM K. LIGGETT, OF COLUMBUS, OHIO, ASSIGNOR TO THE JEFFREY MANUFACTURING COMPANY, OF COLUMBUS, OHIO, A CORPORATION OF OHIO.

BELT TRIPPER.

Application filed August 3, 1922, Serial No. 579,520. Renewed July 16, 1927.

The present invention relates to certain new and useful improvements in belt trippers, and particularly to that class of belt trippers which is adapted to discharge material from a belt conveyor and which may be moved longitudinally of the conveyor in either direction to distribute said material by power derived from the moving belt of the conveyor.

The especial object of this invention is to provide in a machine of the class described, improved devices to automatically reverse the direction of travel of the tripper carriage longitudinally of the conveyor.

This and other objects will be disclosed in the following specification, reference being had to the accompanying drawings of which, Fig. 1 is a side elevation of the preferred embodiment of my invention.

Fig. 3 is a fragmentary plan view of the actuating mechanism of the machine illustrated in Fig. 1.

Fig. 4 is a side elevation of the devices illustrated in Fig. 3.

Fig. 5 is a sectional view taken along the line V—V of Fig. 4.

Fig. 6 is a sectional view taken along the line VI—VI of Fig. 3.

Like numerals refer to similar parts in the several figures.

Figure 1:
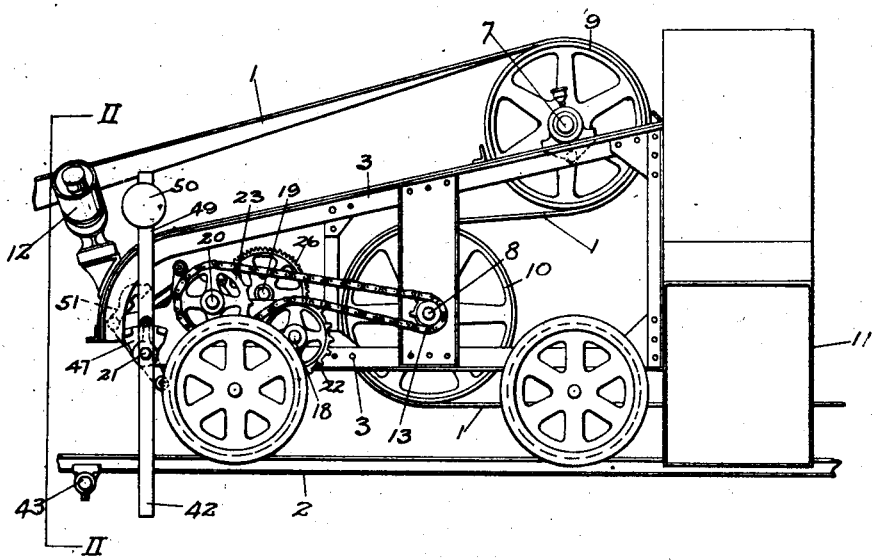
Figure 2:
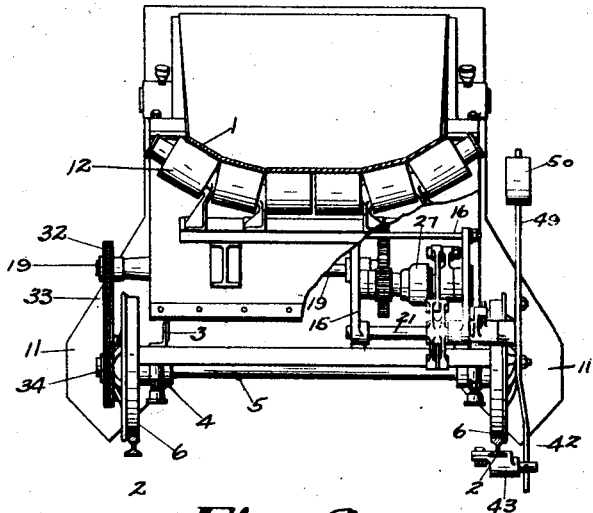
Fig. 2 is a cross sectional view taken along the line II—II of Fig. 1.
Figure 7:
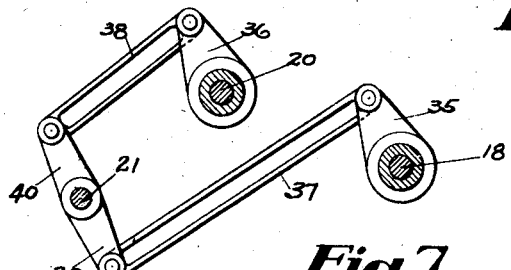
Fig. 7 is a detail of the clutch operating levers.

In the drawings the numeral 1 indicates an endless conveyor belt of the type commonly used for the transportation of grain, or other bulk material. Below the belt 1 and extending parallel therewith, are two track rails 2 upon which is supported for movement longitudinally of the belt a tripper mechanism adapted to discharge material from the belt. The tripper mechanism is mounted in a carriage comprising a main frame 3 to which are fixed journal bearings 4 and in these bearings are mounted the axles 5 of the traction wheels 6 which support the carriage upon the track rails 2. Attached to the frame 3 are journal bearings which support the transverse shafts 7 and 8, and upon these shafts are mounted the idler pulleys 9 and 10 around which the belt laps to form a reflexed loop by which material is discharged from the belt into the open mouth of a laterally extending spout 11 in the manner well understood in conveyor practice. Troughing idler pulleys 12 are carried at the rearward end of the frame 3 to support the belt 1 and guide it onto the upper tripper pulley 9. A sprocket wheel 13 fixed to the shaft 8 of the lower tripper pulley 10, is connected by the endless chain 14 with the power transmission mechanism through which power is transmitted to the track wheels 6 to move the tripper carriage along the track rails 2.

The power transmission mechanism is self-contained, and comprises the side frames 15 which are secured in spaced parallelism by a cross bolt 16 and the floor plate 17. The floor plate 17 is attached to the frame members of the tripper carriage serving to brace it laterally as well as to hold the transmission mechanism in operative position. Formed in the side frames 15 are journal bearings wherein are journaled the transversely extending shafts 18, 19, 20, and 21. Fixed to the shafts 18 and 20 are sprocket wheels 22 and 23 the first of which engages the outside of the chain 14 and the other engages the insides of said chain, thereby causing the shafts 18 and 19 to revolve in opposite directions when the conveyor belt 1 travels around the tripper pulley 9. Freely mounted upon the shafts 18 and 20 are spur pinions 24 and 25 both of which engage the spur gear 26. The pinions 24 and 25 are connectible with their respective shafts by the friction clutches 27 and 28 of the well known multiple disk type. The bearing sleeves 29 and 30, in which these shafts are supported, are screw threaded in apertures of the side frame 15, and are adapted to be moved longitudinally by rotation around their respective shafts. By this endwise movement of the sleeves 29 and 30 pressure may be exerted upon the members of the clutches 27 and 28 to actuate either of the pinions 24 or 25 to drive the spur gear 26 in either direction. The gear 26 is attached to a shaft 19 upon the projecting end of which is a sprocket wheel 32 connected by a suitable driving chain 33 with a sprocket wheel 34 attached to one of the axles 5 to propel the tripper carriage along the track rails 2.

The bearing sleeves 29 and 30 are arranged to be simultaneously rotated in opposite directions by mechanism comprising the rocker arms 35 and 36, fixed to the respective sleeves, and connected by rods 37 and 38 with the oppositely projecting arms 39 and 40 fixed to the rock shaft 21. A lever arm 42 projecting downwardly from the shaft 21 is adapted to contact with stop members 43 adjustably secured to the track rails 2, and when the lever arm 42 is brought, by the movement of the tripper carriage, into contact with the stop members 43 it is rotated rearwardly, thereby causing a rotation of the rock shaft 21 in the direction to cause disengagement of the driving friction clutch and engagement of the idle clutch, thereby reversing the direction of rotation of the driving sprocket 34 to propel the tripper carriage in the opposite direction.

If the lever arm 42 were rigidly attached to the rock shaft 21 movement of the tripper carriage would cease when the rock shaft 21 reached its central neutral position at which both clutches are disengaged. I have therefore provided the hereinafter described devices to cause rotation of the rock shaft 21 beyond said neutral position to clutch engaging position. The lever arm 42 is attached to a hub 44 which is freely rotatable upon the shaft 21, and from this hub there projects a finger 45 positioned between and adapted to engage either of the lugs 46 formed upon the flange 47 of a hub 48 which is keyed to the shaft 21 adjacent the hub 44. The proportions of these parts are such that the lever arm 42 moves through a considerable angular distance on either side of a central vertical plane before engagement of the finger 45 with the lug 46 establishes its connection with the rock shaft 21. An upward extension 49 of the lever arm 42 carries a weight 50 of such proportions that when carried, by the rotation of the lever 42, beyond the central vertical plane, the action of gravity upon said weight will continue the rotation of the hub 48 to produce a sufficient rotation of the rock shaft 21 and insure engagement of the friction clutches and the reversal of the movement of the tripper carriage.

During the operation of the machine the stop members 43 are positioned at the desired limits of travel of the tripper carriage. As said carriage moves along the track rails 2 the lever arm 42 contacts with these stop members causing rotation of the rock shaft 21 to disengage the active clutch and engage the idle clutch thereby reversing the direction of movement of the carriage and causing it to travel back and forth along the track 2 to distribute material from the conveyor in the manner desired.

A link 51 pivoted to the side frame 15 has a notch 52 adapted to engage a lug 53 formed on the flange 47 to hold the rock shaft in its central neutral position. When the rock shaft is so locked the propelling mechanism is held inactive, thereby preventing movement of the tripper carriage along the belt in either direction.

I claim:

1. In an apparatus of the class described, the combination with a conveyor belt, of a carriage adapted to travel longitudinally thereof, traction wheels supporting said carriage, a pulley mounted upon said carriage and engaging said belt, means actuated by said pulley to rotate said traction wheels including oppositely rotating power transmission elements, a driving member adapted to free rotation relative to each of said elements, alternately operable clutches adapted to connect said driving members with their respective transmission elements, and clutch shifting mechanism actuated by movement of said carriage to alternately cause the engagement of said clutches to reverse the direction of travel of said carriage.

2. In an apparatus of the class described, the combination with a conveyor belt, of a carriage adapted to travel longitudinally thereof, traction wheels supporting said carriage, a pulley mounted upon said carriage and engaging said belt, means actuated by said pulley to rotate said traction wheels including oppositely rotating power transmission elements, a driving member adapted to free rotation relative to each of said elements, alternately operable clutches adapted to connect said driving members with their respective transmission elements, clutch shifting mechanism actuated by movement of said carriage to alternately cause the engagement of said clutches to reverse the direction of travel of said carriage, and automatically acting means to insure the movement of said clutch shifting mechanism to its clutch engaging positions.

3. In an apparatus of the class described, the combination with a conveyor belt, of a carriage adapted to travel longitudinally thereof, traction wheels supporting said carriage, a pulley mounted upon said carriage and engaging said belt, means actuated by said pulley to rotate said traction wheels including oppositely rotating power transmission elements, a driving member adapted to free rotation relative to each of said elements, alternately operable clutches adapted to connect said driving members with their respective transmission elements, clutch shifting mechanism actuated by movement of said carriage to alternately cause the engagement of said clutches to reverse the direction of travel of said carriage, and gravity actuated means to insure the movement of said clutch shifting mechanism to its clutch engaging positions.

4. In an apparatus of the class described, the combination with a conveyor belt, of a carriage adapted to travel longitudinally thereof, traction wheel supporting said carriage, a pulley mounted upon said carriage and engaging said belt, means actuated by said pulley to rotate said traction wheels including oppositely rotating power transmission elements, a driving member adapted to free rotation relative to each of said elements, alternately operable clutches adapted to connect said driving members with their respective transmission elements, clutch shifting mechanism including a lever adapted to be rotated by movement of the carriage to the clutch releasing position, and gravity actuated means to continue said rotation to the clutch engaging position to alternately propel the carriage in opposite directions.

5. In an apparatus of the class described, the combination with a conveyor belt, of a carriage adapted to travel longitudinally thereof, a pulley mounted upon said carriage and engaging said belt, means actuated by said pulley to propel said carriage longitudinally of said belt including oppositely rotatable power transmission elements, alternately operable clutches connected with said elements, and mechanism actuated by movement of the carriage to alternately actuate said clutches to propel said carriage in either direction.

6. In an apparatus of the class described, the combination with a conveyor belt, of a carriage adapted to travel longitudinally thereof, traction wheels supporting said carriage, a pulley mounted upon said carriage and engaging said belt, means actuated by said pulley to rotate said traction wheels including oppositely rotatable power transmission elements, alternately operable clutches connected with said elements, clutch shifting mechanism actuated by movement of said carriage to disengage the driving clutch, and automatically acting means to engage the idle clutch to propel the carriage in the reverse direction.

7. The combination with a conveyor belt; of a carriage adapted to travel longitudinally thereof, traction wheels supporting said carriage, an idler pulley mounted upon said carriage and engaging said belt, a pair of oppositely rotatable shafts, sprockets mounted thereon and operatively connected to said idler pulley, a driving member freely rotatable upon each shaft, a driven member rotatable in either direction and operatively connected to said traction wheels, alternately operable clutches adapted to connect said driving members with their respective shafts, and clutch operating mechanism adapted to alternately cause engagement of said clutches.

8. The combination with a conveyor belt; of a carriage adapted to travel longitudinally thereof, traction wheels supporting said carriage, an idler pulley mounted upon said carriage and engaging said belt, a pair of oppositely rotatable shafts, sprockets mounted thereon and operatively connected to said idler pulley, a driving member freely rotatable upon each shaft, a driven member rotatable in either direction and operatively connected to said traction wheels, alternately operable clutches adapted to connect said driving members with their respective shafts, and automatically acting clutch operating mechanism adapted to alternately cause the engagement of either of said clutches.

9. The combination with a conveyor belt; of a carriage adapted to travel longitudinally thereof; traction wheels supporting said carriage, an idler pulley mounted upon said carriage and engaging said belt, a pair of oppositely rotatable shafts, sprockets mounted thereon and operatively connected to said idler pulley, a driving member freely rotatable upon each shaft, a driven member rotatable in either direction and operatively connected to said traction wheels, alternately operable friction clutches adapted to connect said driving members with their respective shafts, and clutch operating mechanism adapted to automatically cause the engagement of either of said clutches.

10. The combination with a conveyor belt; of a carriage adapted to travel longitudinally thereof, traction wheels supporting said carriage, an idler pulley mounted upon said carriage and engaging said belt, a pair of oppositely rotatable shafts, sprockets mounted thereon and operatively connected to said idler pulley, a driving member freely rotatable upon each shaft, a driven member rotatable in either direction and operatively connected to said traction wheels, alternately operable friction clutches adapted to connect said driving members with their respective shafts, and clutch operating mechanism adapted to automatically and alternately cause the engagement of said clutches.

11. The combination with a conveyor belt; of a carriage adapted to travel longitudinally thereof, traction wheels supporting said carriage, an idler pulley mounted upon said carriage and engaging said belt, a pair of oppositely rotatable shafts, sprockets mounted thereon, a sprocket chain operated by said idler pulley and trained around said sprockets, a driving member freely rotatable upon each shaft, a driven member rotatable in either direction and operatively connected to said traction wheels, alternately operable clutches adapted to connect said driving members with their respective shafts, and clutch operating mechanism adapted to alternately cause engagement of said clutches.

12. In a reversing power transmission mechanism, the combination with oppositely rotating power elements, a driving element freely rotatable relative to each power element and connected with a common driven element, frictional devices arranged to connect said driving elements with their respective power elements, elements rotatable concentrically with said power elements and adapted by their rotation to exert pressure upon said friction elements, and automatically acting means to simultaneously and oppositely rotate said pressure exerting elements to alternately actuate said driving elements.

13. In a reversing power transmission mechanism, the combination with oppositely rotating power elements, a driving element freely rotatable relative to each power element and connected with a common driven element, frictional devices arranged to connect said driving elements with their respective power elements, elements rotatable concentrically with said power elements and adapted by their rotation to exert pressure upon said friction elements, and means to simultaneously and oppositely rotate said pressure exerting elements to optionally actuate either of said driving elements.

14. In an apparatus of the class described, the combination with a carriage adapted to travel in either direction, traction wheels supporting said carriage, oppositely rotating power elements mounted upon said carriage, means to rotate said power elements, a driving element freely rotatable relative to each power element, and connected with said traction wheels, a clutch arranged to connect each driving element with its respective power element, elements rotatable concentrically with said power elements and adapted by their rotation to cause the engagement of said clutches, and means to simultaneously and oppositely rotate said clutch operating elements to optionally propel the carriage in either direction.

15. In an apparatus for discharging material from a conveyor belt, the combination with a carriage adapted to travel longitudinally of the belt, shafts journaled in said carriage and actuated by said belt to revolve in opposite directions, power transmission elements adapted to be actuated by said shafts to propel the carriage longitudinally of the belt, clutches arranged to connect either of said shafts with said power transmission elements, and automatically acting means actuated by movement of said carriage to alternately engage said clutches and reverse the direction of travel of the carriage.

16. In an apparatus of the class described, the combination with a conveyor belt, of a carriage adapted to travel longitudinally thereof, a single pulley mounted upon said carriage and engaging said belt, means actuted by said single pulley to propel said carriage longitudinally of said belt including a driven shaft, means for rotating said shaft in either direction including a pair of gear trains, one being operative to drive said shaft in one direction, and the other train being operative to drive said shaft in the other direction, a clutch mechanism for each gear train, clutch shifting mechanism for rendering said clutch mechanisms alternately operative and including a separate lever for each clutch mechanism, and a trip mechanism having operative connection with both of said clutch levers.

17. In a reversing power transmission mechanism the combination with a driven shaft, means for rotating said shaft in either direction including a pair of gear trains, one being operative to drive said shaft in one direction and the other train being operative to drive said shaft in the other direction, a clutch mechanism for each gear train, clutch shifting mechanism for rendering said clutch mechanisms alternately operative and including a separate lever for each clutch mechanism, and a trip mechanism having operative connection with both of said clutch levers.

18. In an apparatus of the class described, the combination with a conveyor belt, of a carriage adapted to travel longitudinally thereof, a single pulley mounted upon said carriage and engaging said belt, means actuated by said single pulley to propel said carriage longitudinally of said belt including oppositely rotatable elements, a clutch mechanism for each rotatable element, a clutch shifting mechanism including a trip lever, a second lever actuated by said trip lever, and a pair of links connected to said clutches and operatively connected to said second lever.

19. In a reversing power transmission mechanism, the combination with drive means, a pair of gears mounted thereon, a pair of clutches mounted on said drive means for operatively connecting either of said gears with said drive means, a driven shaft adapted to be driven in one direction by one of said gears, and in the opposite direction by the other of said gears, clutch shifting mechanism including an independent clutch operating lever for each clutch, and a trip mechanism having operative connection with both of said levers.

20. In a reversing power transmission mechanism, the combination with drive means, a pair of gears mounted thereon, a pair of clutches mounted on said drive means for operatively connecting either of said gears with said drive means, a driven shaft adapted to be driven in one direction by one of said gears and in the opposite direction by the other of said gears, clutch shifting mechanism including a trip lever, a second lever actuated by said trip lever, and a pair of links connected to said clutches, and operatively connected to said second lever.

21. In a reversing power transmission mechanism, the combination with drive means, a pair of gears mounted thereon, a pair of clutches mounted on said drive means for operatively connecting either of said gears with said drive means, a driven shaft adapted to be driven in one direction by one of said gears and in the opposite direction by the other of said gears, clutch shifting mechanism including a separate lever for each clutch, a trip lever, and means connecting said trip lever with said separate levers for causing simultaneous actuation of said clutches.

In testimony whereof, I affix my signature.

WILLIAM K. LIGGETT.